US008464183B2

(12) United States Patent
Vennelakanti et al.

(10) Patent No.: US 8,464,183 B2
(45) Date of Patent: Jun. 11, 2013

(54) SYSTEM AND METHOD FOR DISTINGUISHING MULTIMODAL COMMANDS DIRECTED AT A MACHINE FROM AMBIENT HUMAN COMMUNICATIONS

(75) Inventors: Ramadevi Vennelakanti, Karnataka (IN); Prasenjit Dey, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 139 days.

(21) Appl. No.: 12/842,044

(22) Filed: Jul. 23, 2010

(65) Prior Publication Data

US 2011/0302538 A1    Dec. 8, 2011

(30) Foreign Application Priority Data

Jun. 3, 2010    (IN) .......................... 1541/CHE/2010

(51) Int. Cl.
*G06F 3/048* (2006.01)
*G06F 3/033* (2006.01)
*G09G 5/08* (2006.01)

(52) U.S. Cl.
USPC ........................... 715/863; 715/856; 345/158

(58) Field of Classification Search
USPC ......................................... 715/863; 345/158
See application file for complete search history.

(56) References Cited

U.S. PATENT DOCUMENTS

| | | | |
|---|---|---|---|
| 5,577,165 A | 11/1996 | Takebayashi et al. | |
| 6,754,373 B1 | 6/2004 | de Cuetos et al. | |
| 6,779,060 B1 * | 8/2004 | Azvine et al. | 710/65 |
| 7,151,843 B2 * | 12/2006 | Rui et al. | 382/103 |
| 7,171,025 B2 * | 1/2007 | Rui et al. | 382/103 |
| 7,240,011 B2 | 7/2007 | Horvitz | |
| 7,274,803 B1 | 9/2007 | Sharma et al. | |
| 7,451,088 B1 * | 11/2008 | Ehlen et al. | 704/270.1 |
| 7,505,908 B2 * | 3/2009 | Johnston et al. | 704/275 |
| 7,556,377 B2 * | 7/2009 | Beymer | 351/210 |
| 7,789,492 B2 * | 9/2010 | Akahane | 347/68 |
| 2006/0106920 A1 * | 5/2006 | Steeb et al. | 709/220 |
| 2007/0033053 A1 | 2/2007 | Kronenberg et al. | |
| 2007/0136064 A1 * | 6/2007 | Carroll | 704/254 |
| 2011/0098029 A1 * | 4/2011 | Rhoads et al. | 455/418 |
| 2011/0242043 A1 * | 10/2011 | Yarvis et al. | 345/174 |
| 2012/0165046 A1 * | 6/2012 | Rhoads et al. | 455/456.3 |
| 2012/0221843 A1 * | 8/2012 | Bak et al. | 713/100 |
| 2012/0221875 A1 * | 8/2012 | Bak et al. | 713/323 |

OTHER PUBLICATIONS

Qiaohui Zhang; Atsumi Imamiya; Kentaro Go; Xiaoyang Mao. A Gaze and Speech Multimodal Interface; Publication Date: 2004, vol. 7; on pp. 208-214.

Maja Pantic; Leon J. M. Rothkranyz. Toward an Affect-Sensitive Multimodal Human—Computer Interaction; Publication Date: Sep. 2003, vol. 91; on pp. 1370-1390.

* cited by examiner

*Primary Examiner* — David Phantana Angkool (57) ABSTRACT

A method and system of distinguishing multimodal HCI from ambient human interactions using wake up commands is disclosed. In one embodiment, in a method of distinguishing multimodal HCI from ambient human interactions, a wake up command is detected by a computing system. The computing system is then woken up to receive a valid user command from a user upon detecting the wake up command. A countdown timer is substantially simultaneously turned on upon waking up the computing system to receive valid user commands. The countdown timer is set based on application usage parameters such as semantics of the valid user command and context of an application associated with the valid user command.

17 Claims, 5 Drawing Sheets

SYSTEM AND METHOD FOR DISTINGUISHING MULTIMODAL COMMANDS DIRECTED AT A MACHINE FROM AMBIENT HUMAN COMMUNICATIONS

RELATED APPLICATIONS

Benefit is claimed under 35 U.S.C. 119(a)-(d) to Foreign application Serial No. 1541/CHE/2010 entitled "SYSTEM AND METHOD FOR DISTINGUISHING MULTIMODAL COMMANDS DIRECTED AT A MACHINE FROM AMBIENT HUMAN COMMUNICATIONS" by Hewlett-Packard Development Company, L.P., filed on Jun. 3, 2010, which is herein incorporated in its entirety by reference for all purposes

BACKGROUND

Multimodal human computer interactions (HCI) systems have inherent advantages over computing systems that use only keyboard and mouse as inputs. There has been considerable interest in the space of multimodal HCI due to its naturalness, intuitiveness, and closeness to human-to-human interactions. Gesture and speech are some of the modalities that have been looked at extensively in multimodal HCI.

While using speech as a modality, a major problem encountered is distinguishing speech commands directed at the computing system, from ambient user interactions which are not directed at the computing system. Therefore, drawing attention of the computing system to the speech commands only when they are being directed at the computing system is a very important aspect of the multimodal HCI. In such a way, ambient user interactions which are not directed at the computing system can be rejected. In human-to-human interactions and communications, a number of methods like tapping, establishing eye to eye contact and the like are used to draw the attention of each other, before directing their speech or gesture at them.

In one workaround that aims to distinguish commands directed at the computing system from ambient user interactions, it is considered that all non-command gesture-speech ceases before and while a multimodal gesture-speech command is being issued. Another workaround uses all gesture-speech commands that are designed to be only those that are not used in natural gesture rich communication. Yet another workaround uses a specific gesture or speech as a cue to indicate the starting of an interaction with the computing system, for example calling out the name of the computing system. However, these workarounds are not user friendly or robust to distinguish the multimodal HCI from the ambient human-to-human communications which take place in and around the computing system.

The design of intuitive and natural multimodal HCI, inspired by human-to-human communication methods aims to make multimodal HCI as natural as possible. However, this poses the challenge of making the multimodal HCI distinctive enough for the computing system to be able to distinguish multimodal commands directed at it from ambient human-to-human interactions.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for distinguishing multimodal commands directed at a machine from ambient human communications is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The terms 'multimodal HCI' and 'multimodal commands' are used interchangeably throughout the document. Also, the terms 'human communications' and 'human interactions' are used interchangeably throughout the document.

Figure 1:
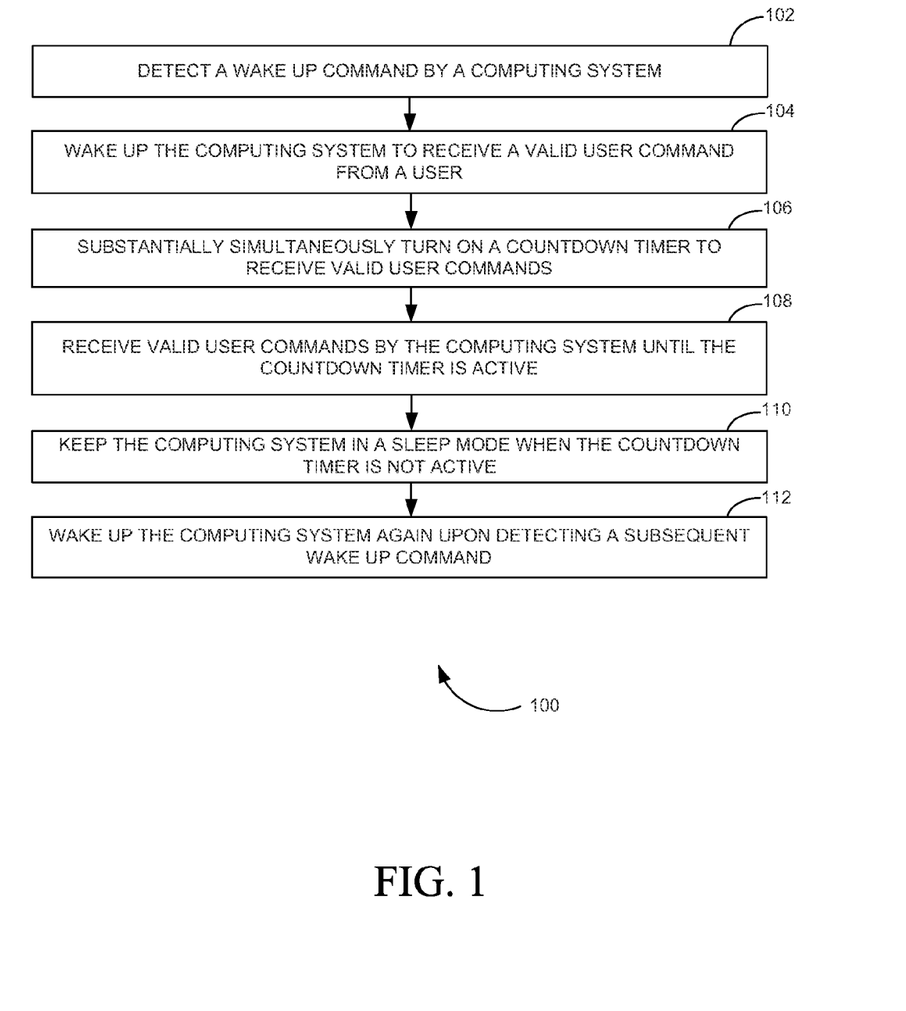
FIG. 1 illustrates a computer implemented flow diagram of an exemplary method for distinguishing multimodal HCI from ambient human interactions.
Figure 2:
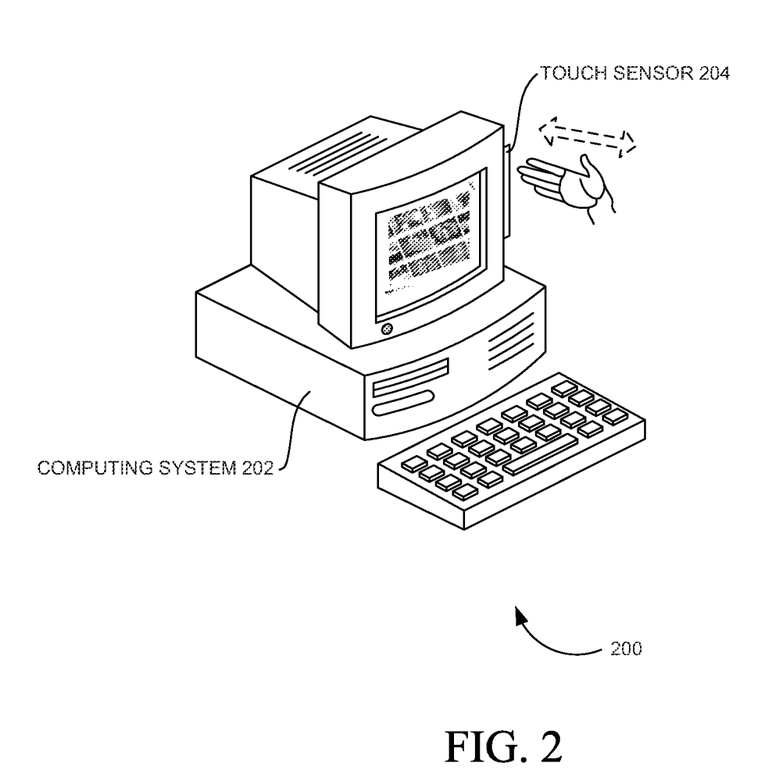
FIG. 2 illustrates a schematic representation of an up-close method used to distinguish multimodal HCI from ambient human interactions, according to one embodiment.
Figure 3:
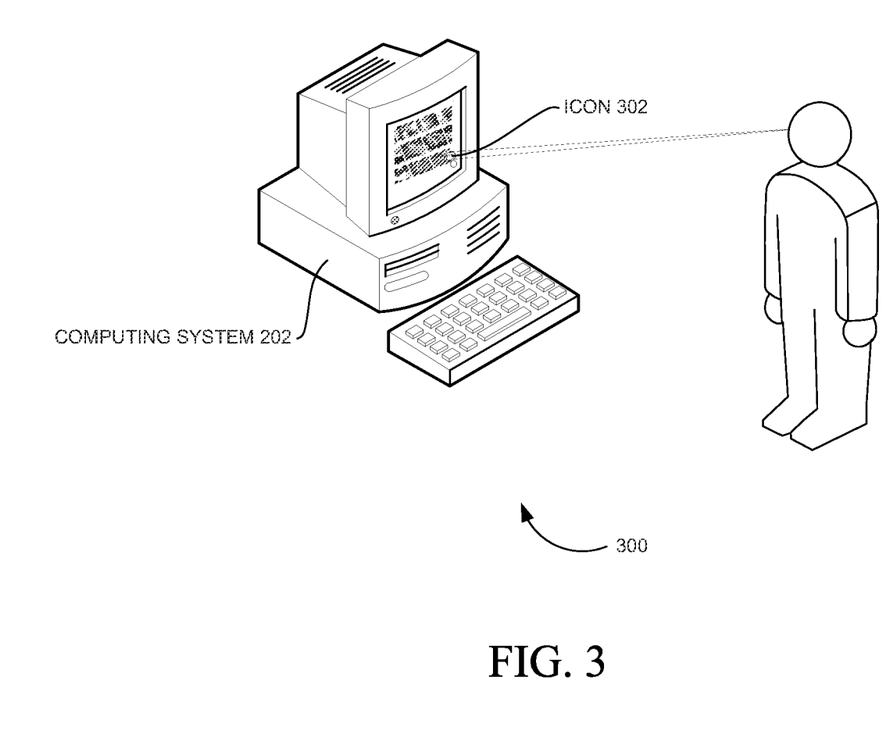
FIG. 3 illustrates a schematic representation of an at-a-distance method used to distinguish multimodal HCI from ambient human interactions, according to one embodiment.

FIG. 1 illustrates a computer implemented flow diagram 100 of an exemplary method for distinguishing multimodal HCI from ambient human interactions. At step 102, a wake up command is detected by a computing system, for example, the computing system 202 of FIGS. 2-4. In one embodiment, the wake up command includes a user tap on the computing system when the user is up-close to the computing system, as illustrated in FIG. 2. In another embodiment, the wake up command includes a user gaze on a specific location, for example, an icon, of a screen of the computing system when the user is at-a-distance from the computing system, as illustrated in FIG. 3. At step 104, the computing system is woken up to receive a valid user command from a user upon detecting the wake up command. The valid user command may include a multimodal command to access an application in the computing system.

At step 106, a countdown timer is substantially simultaneously turned on upon waking up the computing system to receive valid user commands. The countdown timer is set based on application usage parameters such as semantics of the valid user command and context of an application associated with the valid user command. At step 108, valid user commands are received by the computing system until the countdown timer is active. At step 110, the computing system is kept in a sleep mode when the countdown timer is not active. At step 112, the computing system is woken up again upon detecting a subsequent wake up command, for example, a user tap or a user gaze on the icon, substantially around the computing system from the user.

FIG. 2 illustrates a schematic representation 200 of an up-close method used to distinguish multimodal HCI from ambient human interactions, according to one embodiment. Particularly, FIG. 2 illustrates a computing system 202 including a wake up detector which detects a wake up command from the user of the computing system 202. The wake up detector may be a touch sensor 204 or an accelerometer and may be placed on a bezel or on a screen of the computing system 202. As shown in FIG. 2, the touch sensor 204 is placed on the bezel of the computing system 202 to detect the wake up command from the user.

In the embodiment illustrated in FIG. 2, the wake up command includes a user tap, a pat or a touch gesture on the computing system 202, when the user is up-close to the computing system 202. Once the wake up command is detected by the wake up detector, the computing system 202 is woken up to receive a valid user command from the user. For example, in the context of a photo viewing application, valid user commands may include commands such as 'play', 'pause', 'next' and the like. Further, a count down timer is substantially simultaneously turned on upon waking the computing system 202.

According to an embodiment of the present invention, the computing system 202 receives the valid user commands from the user until the count down timer is active. The countdown timer is set based on application usage parameters such as semantics of the valid user command and context of an application associated with the valid user command. For example, in case of the photo viewing application, the command 'next' may be issued more frequently and may be followed by other commands in a closer sequence. Further, the commands 'play' and 'pause' are not issued frequently in the photo viewing application and may not be followed by a quick succession of follow up commands. Hence, when the command 'next' is issued, the computing system 202 listens for a subsequent command more intently and for a longer duration, which means a long count down period, than when the commands 'play' and 'pause' are issued in the photo viewing application.

When the countdown timer is not active, the computing system 202 goes to a sleep mode. Further, upon detecting a subsequent wake up command, for example a user tap on the computing system 202, substantially around the computing system from the user, the computing system 202 is again woken up to receive valid user commands.

FIG. 3 illustrates a schematic representation 300 of an at-a-distance method used to distinguish multimodal HCI from ambient human interactions, according to one embodiment. Particularly, FIG. 3 illustrates the computing system 202 including the wake up command detector using a gaze tracking device. As shown in FIG. 3, the wake up command is detected when the gaze tracking device detects a user gaze on an icon 302. The gaze tracking device detects and registers the user gaze on the icon 302 to wake up the computing system 202.

For example, when a user intends to interact with the computing system 202 from at-a-distance, the user gazes at a specific location, for example the icon 302, on the screen of the computing system 202. The user may be present in an interaction volume of the computing system 202 which is defined based on the principle of proxemics. The eye contact of the user with the icon 302 is detected using the gaze tracking device. Further, a fixated gaze in an approximate region around the icon 302 is used to register the user gaze.

Once the user gaze is detected and registered, the computing system 202 is woken up to receive a valid user command from the user. Similar to the method described in FIG. 2, a counter down timer is substantially simultaneously turned on and is active as long as the user gaze is detected on the computing system 202. The computing system 202 receives the valid user commands as long as the count down timer is active and goes to the sleep mode when the count down timer is not active. The user may need to fix the gaze on the icon 302 on the screen of the computing system 202 to wake the computing system 202 again to receive valid user commands.

Figure 4:
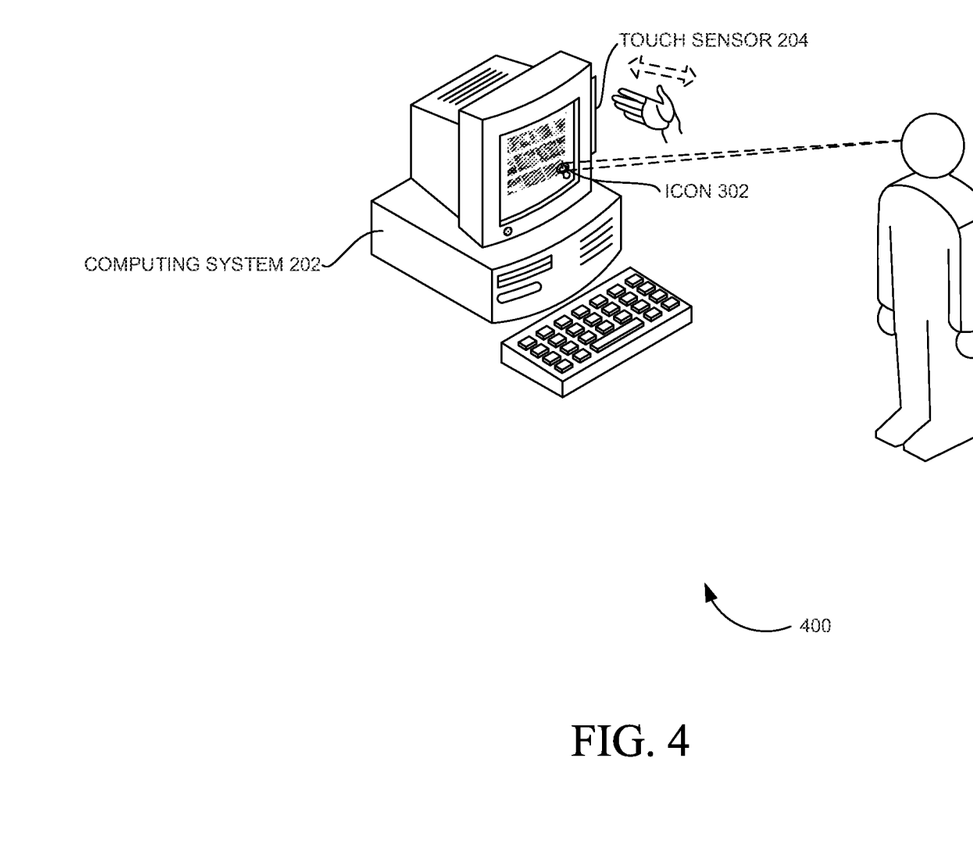
FIG. 4 illustrates a schematic representation of a combination of the up-close and the at-a-distance methods used to distinguish HCI from ambient human interactions, according to one embodiment.

FIG. 4 illustrates a schematic representation 400 of a combination of the up-close and the at-a-distance methods used to distinguish multimodal HCI from ambient human interactions, according to one embodiment. The method illustrated in FIG. 4 is similar to the method illustrated in FIG. 2. As described in FIG. 2, the wake up command includes the user tap on the computing system 202. In the embodiment illustrated in FIG. 4, along with the computing system 202 detecting the user tap as the wake up command, a user gaze on the icon 302 on the screen of the computing system 202 is also detected as the wake up command. This may ensure that accidental and unintentional user taps or tap gestures are not detected as wake up commands by the computing system 202.

Figure 5:
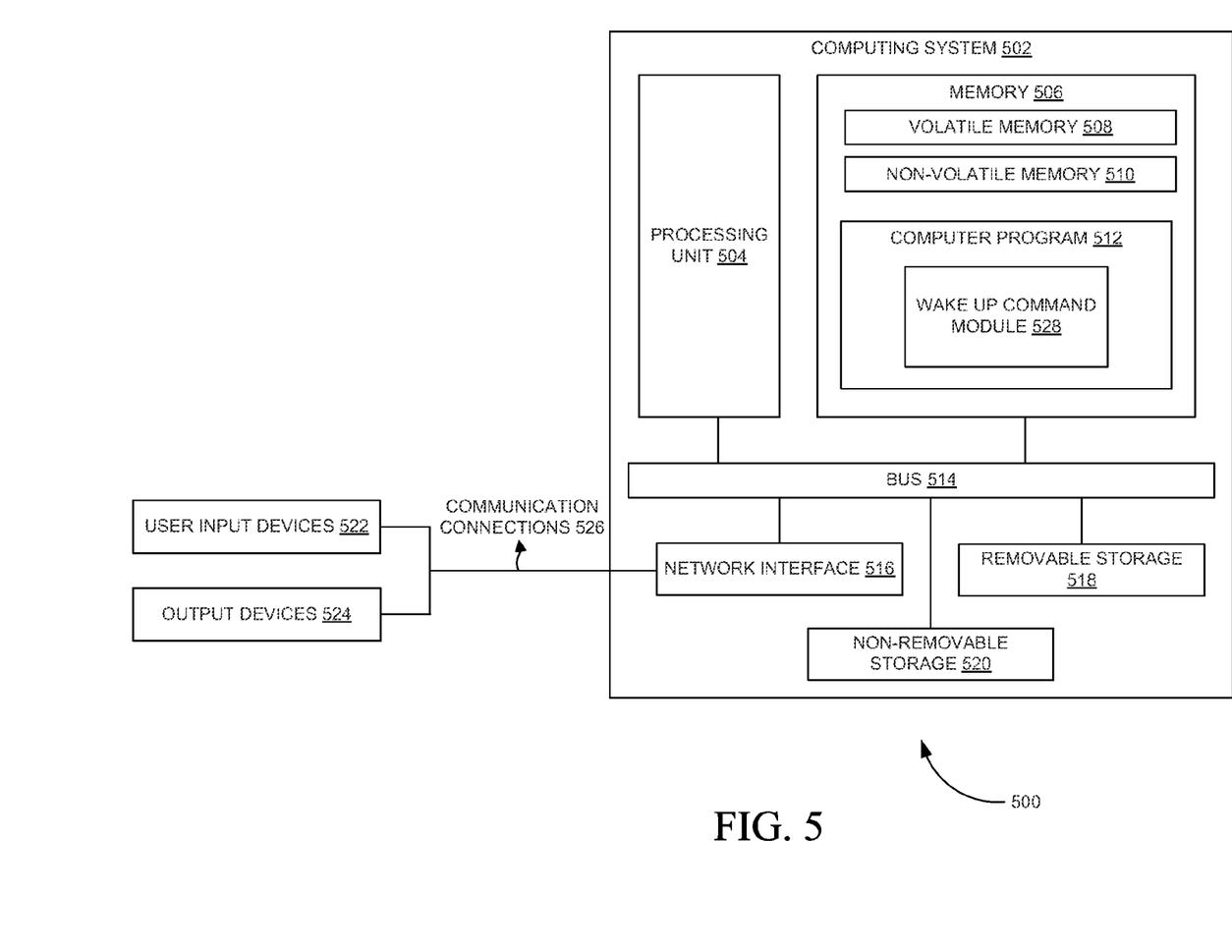
FIG. 5 illustrates an example of a suitable computing system environment for implementing embodiments of the present subject matter.

FIG. 5 shows an example of a suitable computing system environment 500 for implementing embodiments of the present subject matter. FIG. 5 and the following discussion are intended to provide a brief, general description of a suitable computing environment in which certain embodiments of the inventive concepts contained herein may be implemented.

A general computing system 502, in the form of a personal computer or a mobile device may include a processing unit 504, memory 506, a removable storage 518, and a non-removable storage 520. The computing system 502 additionally includes a bus 514 and a network interface 516. The computing system 502 may include or have access to the computing system environment 500 that includes one or more user input devices 522, one or more output devices 524, and one or more communication connections 526 such as a network interface card or a universal serial bus connection.

The one or more user input devices 522 may be a digitizer screen and a stylus, trackball, keyboard, keypad, mouse, a touch sensor, a gaze tracking device and the like. The one or more output devices 524 may be a display device of the personal computer or the mobile device. The communication connections 526 may include a local area network, a wide area network, and/or other networks.

The memory 506 may include volatile memory 508 and non-volatile memory 510. A variety of computer-readable storage media may be stored in and accessed from the memory elements of the computing system 502, such as the volatile memory 508 and the non-volatile memory 510, the removable storage 518 and the non-removable storage 520. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processing unit 504, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processing unit 504 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processing unit 504 of the computing system 502. For example, a computer program 512 may include machine-readable instructions capable of distinguishing multimodal commands directed at a computing system from ambient human interactions, according to the teachings and herein described embodiments of the present subject matter. In one embodiment, the computer program 512 may be included on a compact disk-read only memory (CD-ROM) and loaded from the CD-ROM to a hard drive in the non-volatile memory 510. The machine-readable instructions may cause the computing system 502 to encode according to the various embodiments of the present subject matter.

As shown, the computer program 512 includes a wake up command module 528. For example, the wake up command module 528 may be in the form of instructions stored on a non-transitory computer-readable storage medium. The non-transitory computer-readable storage medium having the instructions that, when executed by the computing system 502, may cause the computing system 502 to perform the one or more methods described in FIGS. 1 through 5.

In various embodiments, the methods and systems described in FIGS. 1 through 5 uses a touch, a gaze, semantics of the valid user commands and context of an application in ascertaining intended user interaction. This may eliminate the use of frontal face detection and lip activity detection which lead to erroneous detection of user attention. A combination of proxemics and semantics of the valid user commands along with the context of the application may be used to specify the count down timer for listening to the valid user commands, which leads to a more robust disambiguation of multimodal commands from ambient human interactions. Further, when the user is at-a-distance from the computing system, the icon is used to register user intent to interact, thus not needing either physical contact or explicit calling out, which may not be possible in interaction from a distance.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method of distinguishing multimodal human computer interactions (HCI) from ambient human interactions using wake up commands, comprising:

detecting, by a computing system, a wake up command to wake the computing system from a sleep mode to place the computing system in a mode to receive a user command;

waking up the computing system to receive the user command in response to detecting the wake up command;

activating a countdown timer in response to waking up the computing system;

receiving a user command for an application running on the computing system; and upon receipt of the user command, setting the countdown timer for a duration, wherein the duration is based upon application usage parameters selected from at least one of semantics of the user command and an expected succession for receiving a follow up command for the application after receiving the user command.

2. The method of claim 1, wherein the wake up command includes a user tap on at least one of a touch sensor and an accelerometer.

3. The method of claim 1, wherein detecting the wake up command includes detecting a user gaze on a specific location of a screen of the computing system, the user being at-a-distance from the computing system.

4. The method of claim 3, wherein the countdown timer remains activated as long as the user gaze is detected.

5. The method of claim 1, wherein the wake up command includes a user tap on at least one of a touch sensor and an accelerometer, and a user gaze on a specific location of a screen of the computing system.

6. The method of claim 1, further comprising:
   receiving user commands, by the computing system, while the countdown timer is active.

7. The method of claim 6, further comprising:
   entering a sleep mode, by the computing system, when the countdown timer is not active;
   detecting a subsequent wake up command initiated from the user; and
   waking up the computing system upon detecting the subsequent wake up command.

8. The method of claim 1, wherein the follow-up command is another command that is the same as the user command.

9. The method of claim 1, wherein the follow-up command is another command that is different from the user command.

10. A non-transitory computer-readable storage medium to distinguish multimodal human computer interactions (HCI) from ambient human interactions using wake up commands having computer code that, when executed by a computing system, cause the computing system to:
    detect a wake up command;
    wake up the computing system in response to a detection of the wake up command;
    activate a countdown timer in response to the wake up of the computing system;
    receive a user command for an application running on the computing system; and
    upon receipt of the user command, setting the countdown timer for a duration, wherein the duration is based upon application usage parameters selected from at least one of semantics of the user command and an expected succession for receiving a follow up command for the application after receiving the user command.

11. The non-transitory computer-readable storage medium of claim 10, wherein the code to detect a wake up command includes code to detect a user tap to the computing system.

12. The non-transitory computer-readable storage medium of claim 10, wherein the code to detect a wake up command includes code to detect a user gaze on a specific location of a screen of the computing system, the user being at-a-distance from the computing system.

13. The non-transitory computer-readable storage medium of claim 10, further comprising code to:
receive user commands while the countdown timer is active.

14. The non-transitory computer-readable storage medium of claim 13, further comprising code to:
place the computing system into to a sleep mode when the countdown timer is not active; and
wake up the computing system in response to a detection of a subsequent wake up command from the user, the user being in a close proximity to the computing system.

15. The non-transitory computer-readable storage medium of claim 10, wherein the countdown timer remains activated as long as the user gaze is detected.

16. A system for distinguishing multimodal human computer interactions (HCI) from ambient human interactions using wake up commands, comprising:
a processor;
a wake up command detector; and
a memory coupled to the processor, wherein the memory includes a wake up command module to:
detect a wake up command by the wake up command detector;
wake up a computing system to receive a user command in response to a detection of the wake up command;
activate a countdown timer in response to a wake up of the computing system;
receive a user command for an application running on the computing system; and
upon receipt of the user command, setting the countdown timer for a duration, wherein the duration is based upon application usage parameters selected from at least one of semantics of the user command and an expected succession for receiving a follow up command for the application after receiving the user command.

17. The system of claim 16, wherein the wake up command detector comprises an accelerometer, a touch sensor or a gaze tracking device.

\* \* \* \* \*

UNITED STATES PATENT AND TRADEMARK OFFICE
CERTIFICATE OF CORRECTION

PATENT NO. : 8,464,183 B2
APPLICATION NO. : 12/842044
DATED : June 11, 2013
INVENTOR(S) : Ramadevi Vennelakanti et al.

Page 1 of 1

It is certified that error appears in the above-identified patent and that said Letters Patent is hereby corrected as shown below:

In the Claims:

In column 7, line 16, in Claim 15, delete "claim 10," and insert -- claim 12, --, therefor.

Signed and Sealed this
Nineteenth Day of November, 2013

Teresa Stanek Rea
*Deputy Director of the United States Patent and Trademark Office*